US012781910B2

(12) United States Patent
Greer

(10) Patent No.: US 12,781,910 B2
(45) Date of Patent: Nov. 3, 2026

(54) SELF-ALIGNING, SHIMMABLE EQUIPMENT CHOCK

(71) Applicant: Iron Horse Energy Services, Inc., Eolia, MO (US)

(72) Inventor: Jerald G Greer, Houston, TX (US)

(73) Assignee: IRON HORSE ENERGY SERVICES, INC., Eolia, MO (US)

( * ) Notice: Subject to any disclaimer, the term of this patent is extended or adjusted under 35 U.S.C. 154(b) by 133 days.

(21) Appl. No.: 18/906,121

(22) Filed: Oct. 3, 2024

(65) Prior Publication Data

US 2025/0116366 A1 Apr. 10, 2025

Related U.S. Application Data

(60) Provisional application No. 63/542,472, filed on Oct. 4, 2023.

(51) Int. Cl.
*F16M 7/00* (2006.01)

(52) U.S. Cl.
CPC .................................... *F16M 7/00* (2013.01)

(58) Field of Classification Search
CPC ................................ F16M 5/00; B23Q 1/0054
See application file for complete search history.

(56) References Cited

U.S. PATENT DOCUMENTS 1,380,347 A * 6/1921 Blume .................. F16B 5/0216 248/188.1
3,361,410 A 1/1968 Messer
4,784,364 A * 11/1988 Chamberlain ........... F16M 7/00 248/673
5,016,338 A * 5/1991 Rowan, Jr. ........... B23Q 1/0054 264/261
5,110,082 A 5/1992 Rowan, Jr.
6,068,234 A 5/2000 Keus
7,438,274 B2 10/2008 Vermeulen
7,717,395 B2 5/2010 Rowan, Jr. et al.
9,285,067 B2 * 3/2016 Hooghart ............. F16B 5/0225
(Continued)

FOREIGN PATENT DOCUMENTS

CN 2235547 9/1996
EP 0316283 5/1989
(Continued)

*Primary Examiner* — Bradley Duckworth
(74) *Attorney, Agent, or Firm* — Fast Forward Law, LLC; David E. Crawford; Brian P. Klein

(57) ABSTRACT

A chock for supporting a frame of a piece of equipment on a foundation. The chock comprises a base, an intermediate element, and an upper element. The base has a planar bottom face to rest on the foundation and a planar upper surface supporting a planar lower surface of the intermediate element. Through holes extend through the base and continue as corresponding blind holes extending into the intermediate element for receiving screw fasteners to clamp the intermediate element to the base and adjust the height of a gap for shims. The intermediate element further comprises a concave upper surface cooperating with a complementary convex lower surface of the upper element allowing the top face of the upper element of the chock to rotate to correspond to an orientation of the frame of the piece of equipment to accommodate angular misalignment thereby evenly distributing frame load across the top face.

20 Claims, 3 Drawing Sheets

(56) References Cited

U.S. PATENT DOCUMENTS

| | | | | |
|---|---|---|---|---|
| 9,810,220 | B2 * | 11/2017 | Ghaisas | F04D 1/00 |
| 11,982,401 | B2 | 5/2024 | Vermeulen et al. | |
| 12,000,533 | B2 | 6/2024 | Vermeulen et al. | |
| 12,287,063 | B2 * | 4/2025 | Vermeulen | F16B 5/0233 |
| 12,398,839 | B2 * | 8/2025 | Vermeulen | F16M 5/00 |
| 2008/0219756 | A1 * | 9/2008 | Grant | F16M 13/00<br>403/122 |
| 2014/0353463 | A1 * | 12/2014 | Ghaisas | F16M 11/24<br>248/346.06 |
| 2023/0011564 | A1 | 1/2023 | Vermeulen et al. | |

FOREIGN PATENT DOCUMENTS

| | | |
|---|---|---|
| JP | 2023-156040 | 10/2023 |
| WO | 2018/233215 | 12/2018 |
| WO | 2003/091618 | 11/2023 |

* cited by examiner

SELF-ALIGNING, SHIMMABLE EQUIPMENT CHOCK

BACKGROUND

The present disclosure is directed to a machine chock and more particularly to a self-aligning and shimmable machine chock.

Industrial equipment is rigidly secured to a foundation such as a reinformed concrete slab or a steel base plate set in epoxy grout to prevent movement during operation. In addition, equipment manufacturers often require the equipment to be level to within specific tolerances to ensure proper operation and predictable life. Equipment frequently includes an assembly of several cooperating components, each of which is carefully leveled and accurately positioned on a common foundation to avoid vibration and prevent detrimental loads from being introduced on the components. For example, rotating components are aligned precisely to prevent bearing loads from exceeding design limits potentially resulting in component failure. Typically, components are mounted on feet or a frame (or skid). During installation, chocks (or supports) are positioned between the component feet or frame and the foundation to support the frame above the foundation. The chocks are adjusted to level the component and position the component relative to other components in the assembly. Improper component installation can cause uneven weight distribution and increased vibration that may compromise equipment performance resulting in decreased efficiency and potential failure.

Chocks of various configurations have been used to permit adjustment. Some chocks are formed as one unitary block, and shims are positioned above or below the block to adjust the effective height of the chock. When additional height is needed, shims are stacked atop one another, and when less height is needed, shims are removed from the stack. Other known chocks are formed as an upper block and a lower block joined by screw fasteners that are turned to adjust the block spacing, thereby adjusting the effective chock height. Sometimes shims are positioned between the upper and lower blocks after the screw fasteners set the block spacing to ensure the proper spacing is maintained. Once the chocks are adjusted to accurately level and position a component, the component is fastened in place. In some instances, threaded fasteners including jamb nuts and locking washers are used to fasten the component in place. Sometimes, the shims are held in place using a grout comprising an aggregate and epoxy resin.

Manufacturers establish installation tolerances that require each chock to be adjusted so its top face is no more than a small distance (e.g., 0.005 inches) from its optimal position. FIG. 1A illustrates an example of a prior art chock designated by the reference character C. The illustrated chock C comprises an upper block U having a top face T and a lower block L. Screw fasteners J are provided to adjust block spacing and shims V are positioned between the upper and lower blocks U, L, respectively, to ensure the top face T is set within the established installation tolerance. The effective height of the chock C is adjusted as previously explained so the component frame S is accurately positioned on the foundation F. In the illustrated example, the foundation F comprises a steel sole plate P set in an aggregate and epoxy resin grout G.

FIG. 1B illustrates an example where the top face T of the chock C is lower than its optimal position, and the frame S of the component is angled relative to the top face of the chock. This condition may be a result of improper initial installation or component movement after operation due to vibrations or other cyclic loading (e.g., thermal expansion and contraction). When this condition exists, a gap forms between the frame S and part of the top face T as indicated at A in FIG. 1B. As will be appreciated, the frame S is unsupported over the gap and the location where the frame is supported by the chock C shifts (to the right as shown). Further, a contact area between the top face T and the frame S indicated at B in FIG. 1B is reduced. When contact area is reduced, loading on the area increases. As will appreciated, the top face T of the chock C may deflect under the increased load, so the chock does not provide sufficiently rigid support or so the top face T is damaged. Thus, there is a need for a chock that adapts to components being out of position by greater distances from optimal (i.e., being more misaligned) without forming gaps or reducing contact area.

One prior chock that permits greater misalignment has three parts, including a cylindrical base having a large threaded central opening, a cylindrical intermediate element having a threaded tubular stem that screws into the opening in the base, and an upper support that rests on the intermediate element. The intermediate element has a shallow concave upper surface that receives a shallow convex lower surface of the support. The concave and convex surfaces have complimentary spherical segment shapes allowing the convex support surface to rotate inside the concave intermediate element surface, so the support is tilts relative to the intermediate element. Because the support is able to tilt relative to the base and intermediate element, a top face of the support can rotate to match a frame that is not level. Thus, a gap does not form between the support and frame and contact area between the support and frame is not reduced. However, heavier components induce higher stresses on the threads of the base and intermediate element. These higher stresses can cause the threads to fail or gall over time.

SUMMARY

In one aspect, the present disclosure includes a chock for supporting equipment on a foundation, the equipment having a frame. The chock comprises a base having a planar bottom face sized and shaped to rest on the foundation for supporting the chock and the equipment, a planar upper surface opposite the planar bottom face, and a through hole extending through the base from the planar bottom face to the planar upper surface. The chock further comprises an intermediate element having a planar lower surface, a concave upper surface opposite the planar lower surface, and a blind hole extending upward into the intermediate element from the planar lower surface. A screw fastener is received by the through hole and threadably engages the blind hole. The screw fastener is selectively rotatable relative to the base and the intermediate element to clamp the intermediate element to the base. The chock further comprises an upper element having a convex lower surface and a top face opposite the convex lower surface. The concave upper surface of the intermediate element and the convex lower surface of the upper element have complimentary spherical segment shapes, allowing the convex lower surface to rotate within the concave upper surface thereby permitting the top face of the upper element to tilt relative to the intermediate element and the base so the top face of the upper element rotates to correspond to an orientation of the frame of the equipment to accommodate angular misalignment between the top face and the frame thereby evenly distributing frame load across the top face.

In another aspect, the present disclosure includes a chock for supporting equipment on a foundation, the equipment having a frame. The chock comprises a base having a planar bottom face sized and shaped to rest on the foundation for supporting the chock and the equipment, a planar upper surface opposite the planar bottom face, and a through hole extending through the base from the planar bottom face to the planar upper surface. The chock further comprises an intermediate element having a planar lower surface, a concave upper surface opposite the planar lower surface, and a blind hole extending upward into the intermediate element from the planar lower surface. The chock comprises a screw fastener received by the through hole and threadably engaging the blind hole. The screw fastener is selectively rotatable relative to the base and the intermediate element to clamp the intermediate element to the base. The chock further comprises an upper element having a convex lower surface and a top face opposite the convex lower surface. The concave upper surface of the intermediate element and the convex lower surface of the upper element have complimentary spherical segment shapes, allowing the convex lower surface to rotate within the concave upper surface, thereby permitting the top face of the upper element to tilt relative to the intermediate element and the base so the top face of the upper element of the chock rotates to correspond to an orientation of the frame of the equipment to accommodate angular misalignment between the top face and the frame, thereby evenly distributing frame load across the top face. The base, the intermediate element, and the upper element each have a corresponding equally sized footprint.

In still another aspect, the present disclosure includes a chock for supporting equipment on a foundation, the equipment having a frame. The chock comprises a base having a planar bottom face sized and shaped to rest on the foundation for supporting the chock and the equipment and a planar upper surface opposite the planar bottom face. The base comprises a central base opening extending through the base from the planar bottom face to the planar upper surface. The base further comprises a first through hole extending through the base from the planar bottom face to the planar upper surface, a second through hole extending through the base from the planar bottom face to the planar upper surface, and a third through hole extending through the base from the planar bottom face to the planar upper surface. The chock further comprises an intermediate element having a planar lower surface and a concave upper surface opposite the planar lower surface. The intermediate element further comprises a central intermediate element opening extending through the intermediate element from the planar lower surface to the concave upper surface. The intermediate element further comprises a first blind hole extending upward into the intermediate element from the planar lower surface and vertically alignable with the first through hole, a second blind hole vertically aligned with the second through hole when the first blind hole is vertically aligned with the first through hole, and a third blind hole vertically aligned with the third through hole when the first blind hole is vertically aligned with the first through hole. The chock comprises a first screw fastener received by the first through hole and threadably engaging the first blind hole to clamp the intermediate element to the base, a second screw fastener received by the second through hole and threadably engaging the second blind hole to clamp the intermediate element to the base, and a third screw fastener received by the third through hole and threadably engaging the third blind hole to clamp the intermediate element to the base. The chock further comprises an upper element having a convex lower surface and a top face opposite the convex lower surface. The concave upper surface of the intermediate element and the convex lower surface of the upper element have complimentary spherical segment shapes, allowing the convex lower surface to rotate within the concave upper surface, thereby permitting the top face of the upper element to tilt relative to the intermediate element and the base so the top face of the upper element rotates to correspond to an orientation of the frame of the equipment to accommodate angular misalignment between the top face and the frame thereby evenly distributing frame load across the top face.

Other aspects of the present disclosure will be apparent in view of the following description and claims.

BRIEF DESCRIPTION OF DRAWINGS

The present disclosure includes non-limiting examples illustrated in the accompanying drawings.

Corresponding reference characters indicate corresponding parts throughout the drawings.

DETAILED DESCRIPTION

Figure 1A:
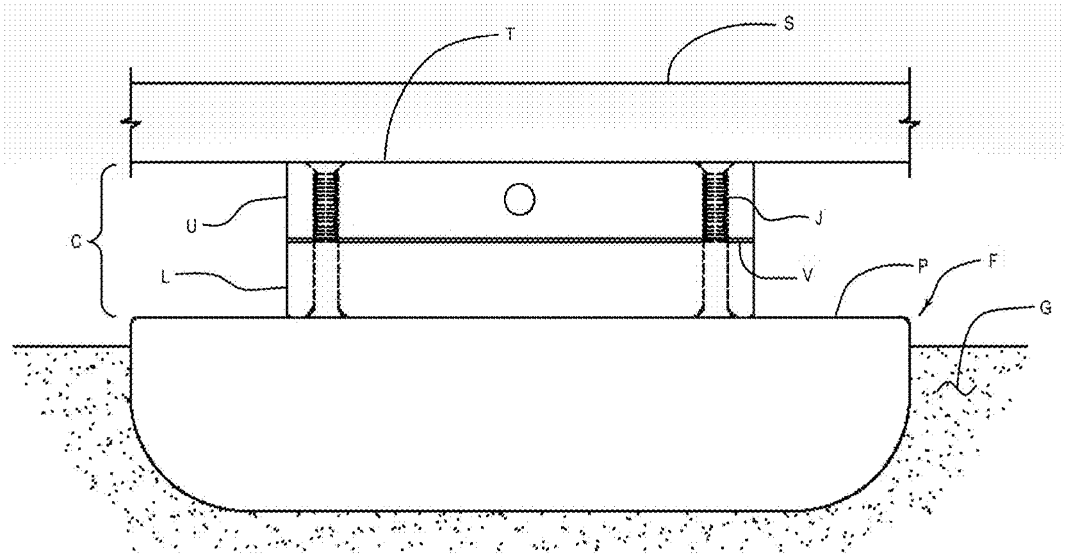
(PRIOR ART) FIG. 1A
FIG. 1A is a schematic elevation of a known chock optimally adjusted to support an equipment component frame on a foundation.
Figure 1B:
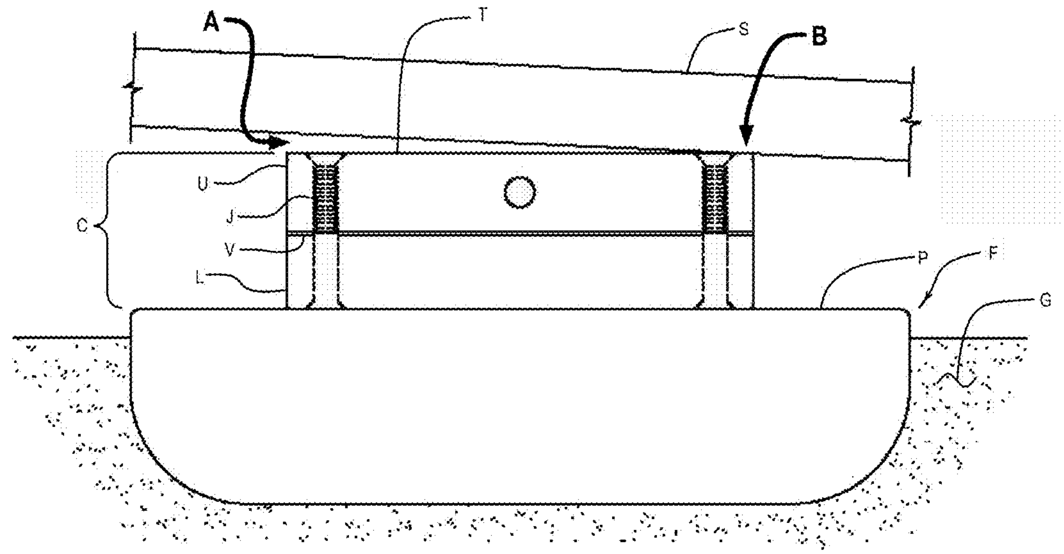
(PRIOR ART) FIG. 1B
FIG. 1B is a schematic elevation of the known chock when misaligned between the equipment component frame and the foundation.
Figure 2:
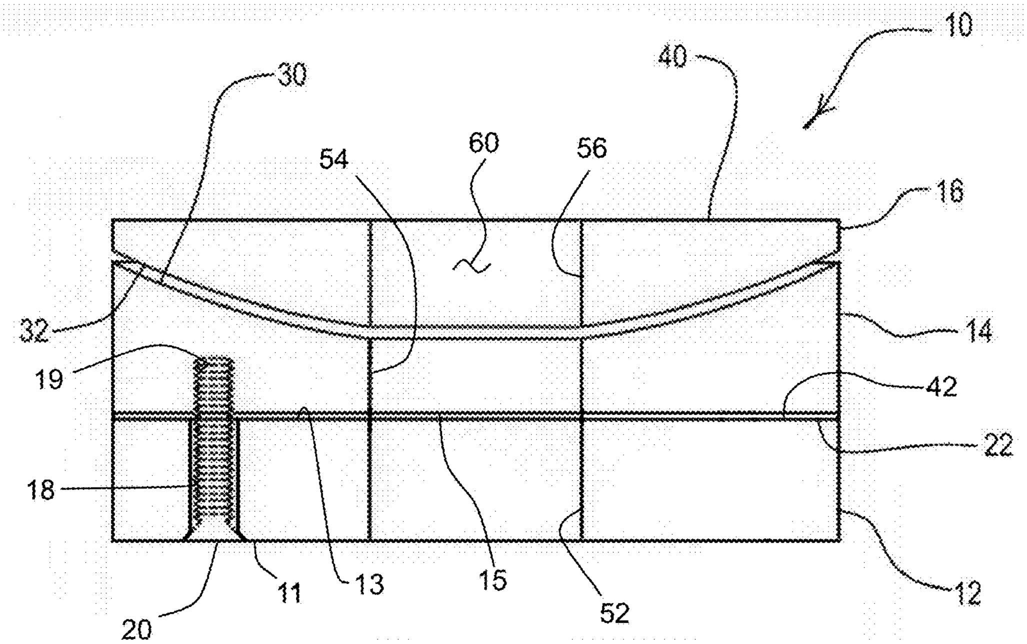
FIG. 2 is a cross-sectional elevation of a chock as described herein taken along line taken along line 2-2 of FIG. 3.
Figure 3:
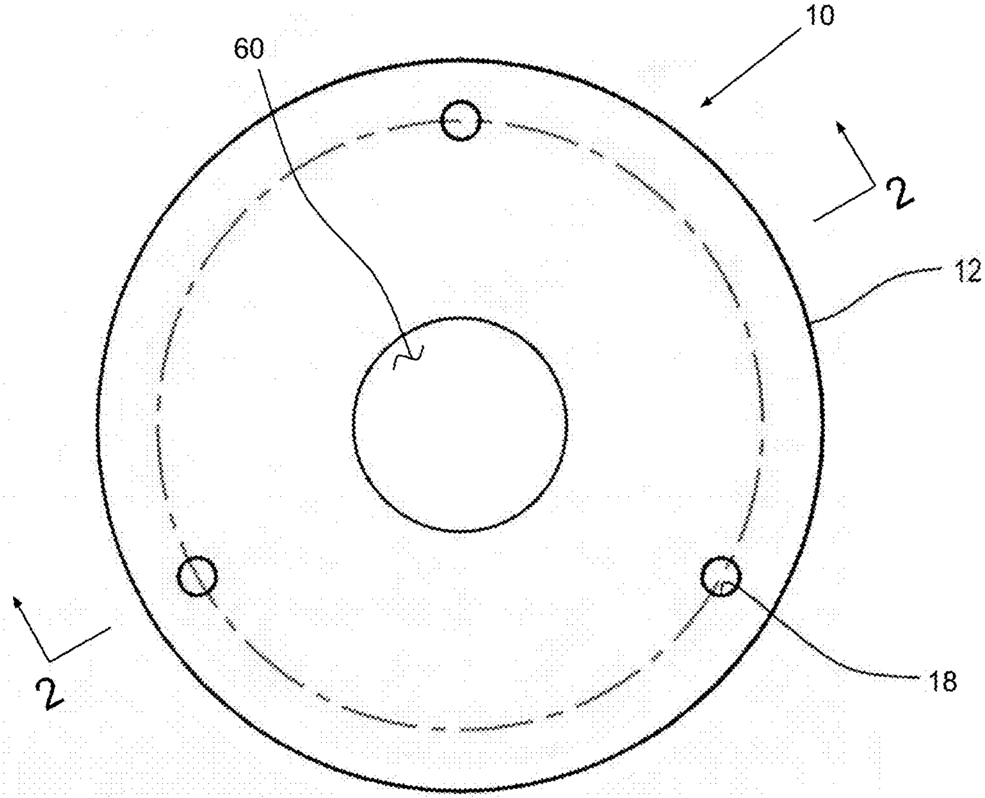
FIG. 3 is a bottom plan of the chock of FIG. 2.

As shown in FIGS. 2 and 3, one example of a chock of the present disclosure is designated in its entirety by the reference number 10. The chock 10 comprises a lower element or base 12, and intermediate element or spacer 14, and an upper element or support 16. Although the elements 12-16 are annular in the illustrated example, each having a corresponding circular footprint or equal size, it is envisioned that the elements may have other shapes. The base 12 has a planar bottom face 11 opposite a planar upper surface 13. When assembled, the planar upper surface 13 faces a planar lower surface 15 of the intermediate element 14. Equally spaced unthreaded through holes 18 are provided in the base 12 extending through the base from the planar bottom face 11 to the planar upper surface 13. Equally spaced threaded blind holes 19 corresponding to the through holes 18 are provided in the intermediate element 14 extending upward into the intermediate element from the planar lower surface 15 for receiving screw fasteners 20 to adjust a height of a gap 22 formed between the lower element 12 and the intermediate element, thereby adjusting an effective height of the chock 10, as will be explained. The chock 10 includes a first screw fastener 20, a second screw fastener, and a third screw fastener received in the three sets of through holes 18 and blind holes 19 in the chock. Although the chock 10 has three sets of through holes 18, blind holes 19, and screw fasteners 20 in the illustrated example, it is envisioned that the chock may have few or more sets. Further, although the sets of through holes 18, blind holes 19, and screw fasteners 20 are evenly spaced in a circular pattern, it is envisioned that the sets may have other spacings and pattern configurations. As will be appreciated, the spaced screw fasteners 20 permit shims 42 to be positioned between the base 12 and intermediate element 14, allowing a selected chock height to be maintained and screw fastener loading to be relieved. The screw fasteners 20 are adapted to be rotated within the respective through holes 18 and the blind holes 19 to clamp the intermediate element 14 to the base 12 and adjust the height of the gap 22 to correspond to the thickness of the shim 42 or shims. Thus, the chock 10 of the present disclosure reduces potential for screw fastener failure or galling compared to prior configurations.

As further illustrated in FIG. 2, the intermediate element 14 has a shallow concave upper surface 30, and the upper element 16 has a shallow convex lower surface 32. The upper surface 30 of the intermediate element 14 and the lower surface 32 of the upper element 16 have complimentary spherical segment shapes. Accordingly, the lower surface 32 of the upper element 16 is able to slide along the upper surface 30 of the intermediate element 14, allowing the upper element to tilt relative to the intermediate element and the base 12. Because the upper element 16 is able to tilt relative to the base 12 and intermediate element 14, a top face 40 of the upper element is able to rotate to match a frame when angled relative to a foundation. Therefore, the chock 10 is configured so a gap does not form between the top face 40 and a frame that is not level. Further, a contact area between the upper element 16 and frame is not reduced when the frame and foundation are not parallel. Moreover, the base 12 has a central base opening 52, the intermediate element 14 has a central intermediate element opening 54, and the upper element 16 has a central upper element opening 56. The central base opening 52, the central intermediate element opening 54, and the central upper element opening 56 cooperate to form a central chock aperture 60 extending through the chock 10 from the planar bottom face 11 of the base 12 to the top face 40 of the upper element 16. In the illustrated example, the central chock aperture 60 is cylindrical.

Figure 4A:
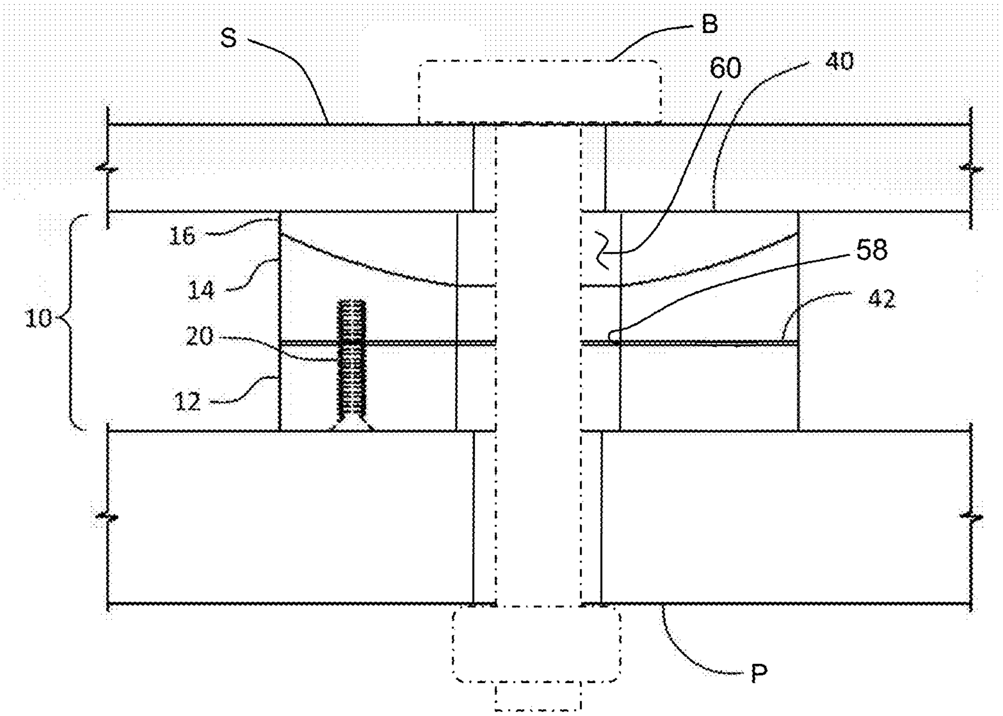
FIG. 4A is a schematic elevation of the chock of FIG. 2 when optimally supporting an equipment component frame on a foundation.
Figure 4B:
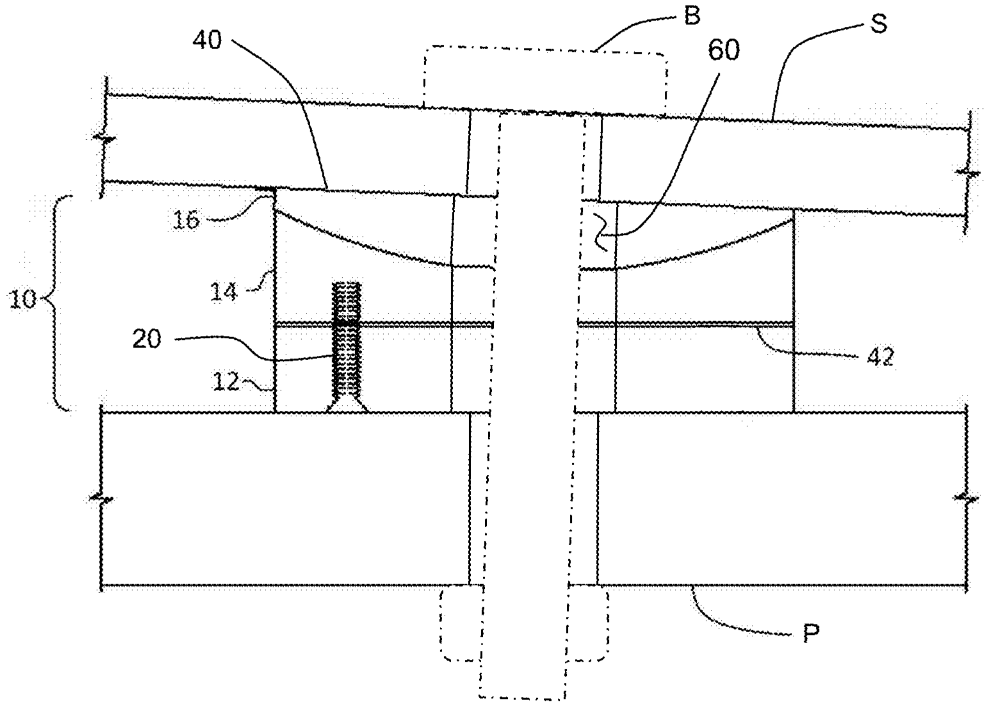
FIG. 4B is a schematic elevation of the chock of FIG. 2 between a misaligned equipment component frame and the foundation.

FIG. 4A schematically illustrates the chock 10 mounted between a component frame or skid S and a foundation comprising a steel plate P where the chock has a height within its established installation tolerance. FIG. 4B shows the chock 10 mounted between the component frame or skid S and the foundation P where the chock is positioned outside of its established installation tolerance. The planar bottom face 11 of the base 12 is sized and shaped to rest on the foundation P for supporting the chock 10 and a piece of equipment. An anchor bolt B sized for passing through the central chock aperture 60 is adapted to secure the base 12, the intermediate element 14, and the upper element 16 of the chock 10 to the foundation P and frame S. Because upper element 16 is capable of rotating relative to the intermediate element 14 and the base 12, the entire top face 40 of the chock 10 remains in contact with the frame S. The full contact area between the top face 40 and the frame S remains constant regardless of misalignment. As will be appreciated, the chock 10 is self-aligning and permits shims 42 sized and shaped to selectively separate the planar upper surface 13 of the base 12 from the planar lower surface 15 of the intermediate element 14 to be installed to reduce screw fastener 20 loading. The screw fastener 20 clamps the shim 42 between the intermediate element 14 and the base 12. The shim 42 has a circular footprint equally sized to the circular footprints of the base 12, the intermediate element 14, and the upper element 16. The shim 42 further comprises a central shim opening 58 cooperating with the central openings 52,54,56 of the elements 12,14,16 to form the central chock aperture 60. Thus, the chock 10 is capable supporting the frame S even when the chock is positioned beyond established installation tolerance. Further, the chock 10 permits precision alignment to be achieved using 0.001 inch thick shims 42 between the base 12 and the intermediate element 14. In addition, the chock 10 further comprises a plurality of shims 42 forming a shim assembly sized and shaped to selectively separate the planar upper surface 13 of the base 12 from the planar lower surface 15 of the intermediate element 14 and wherein the screw fastener 20 clamps the shim assembly between the intermediate element and the base, permitting the gap 22 and the overall height of the chock 10 to be tuned to any height by adding or subtracting shims of different thicknesses. The plurality of shims 42 have different thicknesses.

In one example, the intermediate element 14 and the upper element 16 of the chock 10 are made from hardened steel (e.g., 4140 steel) that is heat treated to provide a Rockwell C strength of about 38 to about 42. Further, each of the spherically shaped surfaces 30, 32 of the intermediate and upper elements 14, 16 is milled to a seven inch radius. The lower element 12 is made from hardened steel (e.g., 4140 steel) or alternatively from a composite, epoxy material. In a kit, the chock 10 is packaged with an assortment of stainless steel (e.g., 316 stainless steel) shims 42 selected from a group of thicknesses consisting of 0.001 inch, 0.003 inches, 0.005 inches, 0.010 inches, and 0.020 inches. Although the lower element 12, the intermediate element 14, and the upper element 16 may have other dimensions, the illustrated elements have an outer diameter of about six inches and a central chock aperture having a diameter of about 1¾ inches. The illustrated lower element 12 has a height of about one inch, the illustrated intermediate element 14 has a height of about 1¼ inches. The illustrated upper element 16 has a height at its outer edge of about ¼ inch. Although screw fasteners 20 having other dimensions are envisioned, the illustrated screw fasteners 20 have a diameter of 5/16 inches and a length of 1½ inches. The illustrated screw fasteners 20 have eighteen threads per inch. The illustrated screw fasteners 20 are centered on a circle having a diameter of five inches.

When introducing elements in this description and the claims, the articles "a", "an", "the", and "said" are intended to indicate one or more of the elements. The terms "comprising", "including", and "having" are intended to be inclusive, indicate there may be other elements in addition to those listed elements.

As those skilled in the art could make various changes to the above constructions, products, and methods without departing from the intended scope of the description, all matter in the above description and accompanying drawings should be interpreted as illustrative and not in a limiting sense. The patentable scope of the disclosure is defined by claims when present, and can include other constructions and methods as would occur to those skilled in the art. Such other constructions are intended to be within the scope of the claims if the structural elements of the constructions do not differ from the literal language of the claims, or if the constructions include equivalent structural elements having insubstantial differences from the literal languages of the claims.

To the extent that the specification, including the claims and accompanying drawings, discloses additional subject matter that is not within the scope of the claims, the disclosures are not dedicated to the public and the right to file one or more applications having claims directed the additional disclosures is reserved.

The invention claimed is:

1. A chock for supporting equipment on a foundation, the equipment having a frame, said chock comprising:

a base having a planar bottom face sized and shaped to rest on the foundation for supporting the chock and the equipment, a planar upper surface opposite the planar bottom face, and a through hole extending through the base from the planar bottom face to the planar upper surface;

an intermediate element having a planar lower surface, a concave upper surface opposite the planar lower surface, and a blind hole extending upward into the intermediate element from the planar lower surface;

a screw fastener received by the through hole and threadably engaging the blind hole, said screw fastener being selectively rotatable relative to the base and the intermediate element to clamp the intermediate element to the base; and an upper element having a convex lower surface and a top face opposite the convex lower surface, said concave upper surface of the intermediate element and said convex lower surface of the upper element having complimentary spherical segment shapes, allowing the convex lower surface to rotate within the concave upper surface thereby permitting the top face of the upper element to tilt relative to the intermediate element and the base so the top face of the upper element rotates to correspond to an orientation of the frame of the equipment to accommodate angular misalignment between the top face and the frame thereby evenly distributing frame load across the top face.

2. A chock as set forth in claim 1, wherein:

said through hole constitutes a first through hole and the base has a second through hole and a third through hole;

said blind hole constitutes a first blind hole vertically alignable with the first through hole, and the intermediate element has a second blind hole vertically aligned with the second through hole when the first blind hole is vertically aligned with the first through hole and a third blind hole vertically aligned with the third through hole when the first blind hole is vertically aligned with the first through hole;

said screw fastener constitutes a first screw fastener received by said first through hole and threadably engaging said first blind hole and the chock further comprises a second screw fastener received by said second through hole and threadably engaging said second blind hole and a third screw fastener received by said third through hole and threadably engaging said third blind hole;

said first screw fastener is adapted to be rotated in said first through hole and said first blind hole, said second screw fastener is adapted to be rotated in said second through hole and said second blind hole, and said third screw fastener is adapted to be rotated in said third through hole and said third blind hole to clamp the intermediate element to the base.

3. A chock as set forth in claim 2 wherein said first through hole, said second through hole, and said third through hole are equally spaced about the base.

4. A chock as set forth in claim 1 wherein said base has a circular base footprint, said intermediate element has a circular intermediate element footprint, and said upper element has a circular upper element footprint.

5. A chock as set forth in claim 4 wherein the circular base footprint, the circular intermediate element footprint, and the circular upper element footprint are equally sized.

6. A chock as set forth in claim 1 wherein:

said base has a central base opening;

said intermediate element has a central intermediate element opening;

said upper element has a central upper element opening; and the central base opening, the central intermediate element opening, and the central upper element opening cooperate to form a central chock aperture extending through the chock from the planar bottom face of the base to the top face of the upper element.

7. A chock as set forth in claim 6 wherein:

the central base opening is cylindrical, the central intermediate element opening is cylindrical, and the central upper element opening is cylindrical; and the central base opening, the central intermediate element opening, and the central upper element opening are equally sized.

8. A chock as set forth in claim 7 further comprising an anchor bolt sized for passing through the central chock aperture to secure said base, said intermediate element, and said upper element to the foundation.

9. A chock as set forth in claim 1 wherein:

the spherical segment shape of said concave upper surface has a seven inch radius; and the spherical segment shape of said convex lower surface has a seven inch radius.

10. A chock as set forth in claim 1 wherein said intermediate element and said upper element each comprise hardened steel having a Rockwell C strength of about 38 to about 42.

11. A chock as set forth in claim 1 wherein said base comprises at least one material selected from a hardened steel and a composite, epoxy material.

12. A chock as set forth in claim 1 further comprising a shim sized and shaped to selectively separate the planar upper surface of the base from the planar lower surface of the intermediate element and wherein the screw fastener clamps the shim between the intermediate element and the base.

13. A chock as set forth in claim 12 wherein said base, said shim, said intermediate element, and said upper element each have a corresponding circular footprint.

14. A chock as set forth in claim 12 wherein:

said base has a central base opening;

said shim has a central shim opening;

said intermediate element has a central intermediate element opening;

said upper element has a central upper element opening; and the central base opening, the central shim opening, the central intermediate element opening, and the central upper element opening cooperate to form a central chock aperture passing through the chock.

15. A chock as set forth in claim 12 wherein said shim has a thickness selected from a group of thicknesses consisting of 0.001 inch, 0.003 inches, 0.005 inches, 0.010 inches, and 0.020 inches.

16. A chock as set forth in claim 15 wherein said shim comprises stainless steel.

17. A chock as set forth in claim 1 further comprising a plurality of shims forming a shim assembly sized and shaped to selectively separate the planar upper surface of the base from the planar lower surface of the intermediate element and wherein the screw fastener clamps the shim assembly between the intermediate element and the base.

18. A chock as set forth in claim 17 wherein the plurality of shims have different thicknesses.

19. A chock for supporting equipment on a foundation, the equipment having a frame, said chock comprising:

a base having a planar bottom face sized and shaped to rest on the foundation for supporting the chock and the equipment, a planar upper surface opposite the planar bottom face, and a through hole extending through the base from the planar bottom face to the planar upper surface;

an intermediate element having a planar lower surface, a concave upper surface opposite the planar lower surface, and a blind hole extending upward into the intermediate element from the planar lower surface;

a screw fastener received by the through hole and threadably engaging the blind hole, said screw fastener being selectively rotatable relative to the base and the intermediate element to clamp the intermediate element to the base; and an upper element having a convex lower surface and a top face opposite the convex lower surface, said concave upper surface of the intermediate element and said convex lower surface of the upper element having complimentary spherical segment shapes, allowing the convex lower surface to rotate within the concave upper surface, thereby permitting the top face of the upper element to tilt relative to the intermediate element and the base so the top face of the upper element of the chock rotates to correspond to an orientation of the frame of the equipment to accommodate angular misalignment between the top face and the frame thereby evenly distributing frame load across the top face; and wherein said base, said intermediate element, and said upper element each have a corresponding equally sized footprint.

20. A chock for supporting equipment on a foundation, the equipment having a frame, said chock comprising:

a base having a planar bottom face sized and shaped to rest on the foundation for supporting the chock and the equipment, a planar upper surface opposite the planar bottom face, a central base opening extending through the base from the planar bottom face to the planar upper surface, a first through hole extending through the base from the planar bottom face to the planar upper surface, a second through hole extending through the base from the planar bottom face to the planar upper surface, and a third through hole extending through the base from the planar bottom face to the planar upper surface;

an intermediate element having a planar lower surface, a concave upper surface opposite the planar lower surface, a central intermediate element opening extending through the intermediate element from the planar lower surface to the concave upper surface, a first blind hole extending upward into the intermediate element from the planar lower surface and vertically alignable with the first through hole, a second blind hole vertically aligned with the second through hole when the first blind hole is vertically aligned with the first through hole, and a third blind hole vertically aligned with the third through hole when the first blind hole is vertically aligned with the first through hole;

a first screw fastener received by the first through hole and threadably engaging the first blind hole to clamp the intermediate element to the base;

a second screw fastener received by the second through hole and threadably engaging the second blind hole to clamp the intermediate element to the base;

a third screw fastener received by the third through hole and threadably engaging the third blind hole to clamp the intermediate element to the base; and an upper element having a convex lower surface and a top face opposite the convex lower surface, said concave upper surface of the intermediate element and said convex lower surface of the upper element having complimentary spherical segment shapes, allowing the convex lower surface to rotate within the concave upper surface thereby permitting the top face of the upper element to tilt relative to the intermediate element and the base so the top face of the upper element rotates to correspond to an orientation of the frame of the equipment to accommodate angular misalignment between the top face and the frame thereby evenly distributing frame load across the top face.

* * * * *